US008552854B2

(12) United States Patent
Autret et al.

(10) Patent No.: US 8,552,854 B2
(45) Date of Patent: Oct. 8, 2013

(54) METHOD FOR REPROGRAMMING BIDIRECTIONAL OBJECTS

(75) Inventors: Capucine Autret, Marnaz (FR); Jean-Michel Orsat, Chatillon-sur-Cluses (FR)

(73) Assignee: Somfy, Cluses (FR)

( * ) Notice: Subject to any disclaimer, the term of this patent is extended or adjusted under 35 U.S.C. 154(b) by 1067 days.

(21) Appl. No.: 10/506,951

(22) PCT Filed: Mar. 18, 2003

(86) PCT No.: PCT/FR03/00860

§ 371 (c)(1), (2), (4) Date: Apr. 8, 2005

(87) PCT Pub. No.: WO03/081352

PCT Pub. Date: Oct. 2, 2003

(65) Prior Publication Data

US 2005/0225428 A1 Oct. 13, 2005

(30) Foreign Application Priority Data

Mar. 26, 2002 (FR) ..................................... 02 03752

(51) Int. Cl.
*G06F 7/00* (2006.01)

(52) U.S. Cl.
USPC ....................................................... 340/539.1

(58) Field of Classification Search
USPC ............ 340/5.22, 5.64, 5.61, 825.57, 825.62, 340/825.69, 5.21, 5.23, 5.24, 5.25, 825.22, 340/825.72, 531, 539.1, 539.11, 12.1, 12.13, 340/12.15, 12.22, 12.23, 12.28
See application file for complete search history.

(56) References Cited

U.S. PATENT DOCUMENTS

| | | | | |
|---|---|---|---|---|
| 3,821,704 | A | 6/1974 | Sabsay | |
| 4,529,980 | A * | 7/1985 | Liotine et al. | 340/825.52 |
| 5,144,667 | A * | 9/1992 | Pogue et al. | 380/45 |
| 5,148,159 | A * | 9/1992 | Clark et al. | 340/825.22 |
| 5,576,701 | A * | 11/1996 | Heitschel et al. | 340/5.31 |

(Continued)

FOREIGN PATENT DOCUMENTS

| | | | |
|---|---|---|---|
| EP | 0 688 929 | A2 | 12/1995 |
| EP | 1 085 481 | A2 | 9/1999 |

(Continued)

OTHER PUBLICATIONS

English translation of abstract of JP 64-062044, Publication date: Aug. 3, 1989.

(Continued)

*Primary Examiner* — Jennifer Mehmood
*Assistant Examiner* — Yong Hang Jiang
(74) *Attorney, Agent, or Firm* — Husch Blackwell LLP

(57) ABSTRACT

A method for reprogramming bidirectional objects is disclosed. The objects contain a common key, at least two objects being paired to allow the sending of a command from one object of the pair to the other object of the pair and the execution of the command by the other object. The method includes the steps of 1) providing the objects with a new common key; 2) then when a command is sent from one object to another object with which it is paired, verifying that the two objects contain the new common key, and 3) refusal by the other object to execute the command if the two objects do not contain the new common key.

25 Claims, 3 Drawing Sheets

(56) References Cited

U.S. PATENT DOCUMENTS

| | | | | |
|---|---|---|---|---|
| 6,026,165 | A * | 2/2000 | Marino et al. | 380/273 |
| RE36,703 | E | 5/2000 | Heitschel et al. | |
| 6,617,961 | B1 * | 9/2003 | Janssen et al. | 340/5.8 |
| 7,046,991 | B2 * | 5/2006 | Little et al. | 455/410 |

FOREIGN PATENT DOCUMENTS

| | | |
|---|---|---|
| JP | 64-062044 | 3/1989 |
| JP | 2000-516313 | 5/2000 |
| JP | 2001-189721 | 7/2001 |
| WO | WO 98/55717 | 12/1998 |
| WO | WO 01/77764 A2 | 10/2001 |

OTHER PUBLICATIONS

English translation of abstract of JP 2001-189721, Publication date: Oct. 7, 2001.

Jaap Haartsen, Bluetooth—The universal radio interface for ad hoc, wireless connectivity, Ericsson Review No. 3, 1998, pp. 110-117, P.D: Oct. 2001.

R. Shepherd, Bluetooth wireless technology in the home, Electronics & Communication Engineering Journal, Oct. 2001, pp. 195-203.

English translation of abstract of Korean Publication No. 1020000068050A, Publication Date: Nov. 25, 2000.

US 6,982,795, 01/2006, Sato (withdrawn)

* cited by examiner

METHOD FOR REPROGRAMMING BIDIRECTIONAL OBJECTS

BACKGROUND OF THE INVENTION

The invention relates to the field of the remote control of actuators and in particular, the wireless control of actuators used in the amenities and security of buildings, in particular for lighting, operating closures, solar protection, ventilation and air-conditioning systems etc.

In the current design of such systems, such actuators and/or associated sensors are controlled by control units or control points capable of communicating by reception but also by transmission via a bidirectional link, typically a radio frequency link. The actuators and or sensors and the control units can therefore be qualified generically as bidirectional objects. The actuators and or sensors are often installed in the parts of the building which are difficult to access for the installer and even more difficult for the user.

The control points are unidirectional or bidirectional, roving or fixed. Very often a fixed control point is itself battery powered, which avoids wiring. When a control point is equipped with a transceiver, the reception function can only be activated on command or intermittently in order to limit consumption.

A pairing procedure makes it possible to associate a common identifier with a pair formed of an actuator and a control point. The sharing of a common identifier then makes it possible for the actuator to recognize the controls originating from the control point, in command to respond to it. The pairing procedure can be repeated so as to control several actuators from one control point or also so that one actuator responds to several control points. Depending on the pairing procedure, the identifier is transmitted from the control unit of the actuator to the control point, which records it, or conversely from the control point to the control unit of the actuator, which records it. Pairing solutions are, for example, described in U.S. Pat. No. 4,529,980 or U.S. Pat. No. 5,148,159 or also in French patent applications filed by the Applicant under serial numbers 01 09369 of Jul. 13, 2001 and 01 16709 of Dec. 21, 2001.

When it is a question not only of amenity but also security, a problem arises if a control point is lost or stolen. In fact, a stolen actuator can be used remotely, for example, to deactivate an alarm or also to open a door or a rolling shutter.

U.S. Pat. No. Re 36,703 presents a solution to such a problem. It relates to a control unit of an actuator for garage doors which is able to learn several identifiers, all different, belonging to different remote control transmitters. A software or mechanical pointer allows a new memory location to be assigned to a new transmitter. In the case of loss (or stealing) of one of the transmitters, the corresponding memory location is pointed to in order to enter the code of the replacement transmitter there. The old transmitter thus becomes invalid in that its identifier is overwritten by the writing of a new identifier. This solution requires that a table of the relationships between transmitters and memory locations assigned to each transmitter be kept in a safe place.

EP-A-0,688,929 describes learning mechanisms in code hopping systems, with an analog solution. This document states that it may be necessary to exclude a transmitter from the system. The solution proposed is as follows: an encoder is excluded by suppressing the corresponding codes in the decoder—in other words simply separating the encoder and the decoder.

Another solution consists in starting a pairing procedure of all of the actuators again. The French patent application filed on Jul. 7, 2001 under Ser. No. 01 09369 thus proposes actuators, in which action on the power supply causes actuation of the programming mode. Another solution consists in resetting an actuator by actuating the phase of a specific wire as disclosed in FR-A-2,808,834. It is understood that such means requires that the pairing procedures be started again completely. To compensate for the loss or disappearance of a command point we are thus required to delete the indentifiers of all of the command points of the installation. Moreover this solution is complex and it is not always possible to implement it, in particular in the case of command points preassigned to actuators in the factory or when the various actuators are not accessible.

In the field of electronic locks it has been proposed to take advantage of the introduction of a new key to eject the code of the preceding one. Such a method is used for example in the documents EP-A-0,171,323 or even earlier U.S. Pat. No. 3,821,704. In a hotel room lock, an electronic key contains a code with two fields A and B. Field A contains the valid access code, field B contains the authorization field. A new key is provided for the next client, this time containing B and C. The first field is used to control the opening if there is identity between the one read on the key and the one recorded in the lock. If there is no identity, the lock compares this first field to the authorization code recorded in the lock. If there is identity, the lock records this code as a valid access code and records the second field of the key as a new authorization code.

EP-A-1,085,481 discloses an installation in which all of the elements of the installation share a site code, unique to the site. The site code is used by the transmitters to encrypt the information transmitted to the receiver. The receiver decrypts the information that it receives from the transmitters, using the site code. It responds to the commands of a transmitter if the information that it receives from this transmitter agrees with the information received previously from the transmitter. The advantage presented in the document is that any programming of the receiver is avoided. However, this document does not mention the problem of loss of a transmitter or deletion of a transmitter; in fact the proposed solution makes the deprogramming of one of the transmitters impossible.

Thus a problem still exists in the case of loss or stealing of a control unit, or more generally when seeking to exclude an object from a group of paired objects.

SUMMARY OF THE INVENTION

The invention thus discloses a method for reprogramming bidirectional objects containing a common key, at least two objects being paired to allow the sending of a command from one object of the pair to the other object of the pair and the execution of the command by the other object; the method comprises the steps of:

- providing the objects with a new common key; then
- when a command is sent from one object to another object with which it is paired, verification that the two objects contain the new common key, and
- refusal by the other object to execute the command if the two objects do not contain the new common key.

Advantageously, the step of verification for two given objects is implemented only when the first command is given following provision of the new common key.

The step of providing a new common key can comprise:

- the generation of a new common key and
- the transmission of the new common key generated.

In this case the step of generation can be carried out using a single object or using two objects. The transmission can be a point-to-multipoint transmission or a point-to-point transmission. In this last case, the point-to-point transmission preferably comprises an action by the user on each point.

It can also be foreseen that the transmission step comprises:

a point-to-point transmission in a sub-group of the objects;

a point-to-multipoint transmission to another sub-group of the objects.

In one embodiment, the transmission step comprises, when the new common key is transmitted from one object to another object, verification that the two objects contain the old common key.

The invention also discloses an operating program for a bidirectional object capable of storing at least one common key and at least one piece of information on pairing, comprising:

(a) a routine of reception of a new common key;

(b) a routine of reception of a command;

(c) a routine of verification for a command received from a paired transmitter object of the presence of the common key in the transmitter object, and (d) a routine of refusal to execute the command if the verification is negative.

Advantageously, the routine of verification is used for a given pairing only when the first command is received.

The invention also discloses an operating program for a bidirectional object capable of storing at least one common key and at least one piece of information about pairing, comprising:

(a) a routine of reception of a new common key;

(b) a routine of transmission of a command to a targeted paired object;

(c) a routine of verification of the presence of the common key in the targeted object.

Advantageously, the routine of verification for a given pairing is implemented only when the first command is transmitted.

One or the other of these programs can also comprise a routine of generation of a new common key. This preferably has a sub-routine of transmission of a command to generate the common key to another object.

A routine of transmission to another object of a new common key or a routine of transmission to several other objects of a new common key can also be foreseen.

Finally, the invention discloses a bidirectional object having:

a stage of reception;

a stage of transmission a logical unit controlling the step of reception and the step of transmission, and a memory containing such a program.

Other characteristics and advantages of the invention will become apparent when reading the description which follows, given by way of example and with reference to the drawings

DETAILED DESCRIPTION

In the remainder of the description, the invention is described in an example of application with pairing of integrated home automation systems; it is not limited to such systems. Hereafter the words "command transmitter" and "command receiver" are used to designate objects whose function is to transmit or receive the commands given by a user; a command transmitter is also commonly called a control unit, while a command receiver is an actuator or an associated sensor. These names are not representative of the functionalities of the "transmitters" or "receivers", which from the point of view of the signals, are capable of transmitting as well as receiving. Thus we could have said "bidirectional object", i.e. an object presenting transmission and reception capabilities. For clarification of the explanation, the words "transmitters" or "receivers" are used—which represent only the assignment of a given bidirectional object to a particular usage.

In the remainder of the description it is also assumed that each bidirectional object is equipped with a univalent identifier; this can be an identifier corresponding to a code of the object, given in the factory and which can not be modified; this can also be a number which can be modified, such as a random number chosen in the object or a number chosen using microswitches. The origin of the identifier has no effect on the functioning of the method. It is also noted that the identifier used hereafter can be modified after definition of the group or after pairing: it serves only to identify an object during the pairing.

Figure 1:
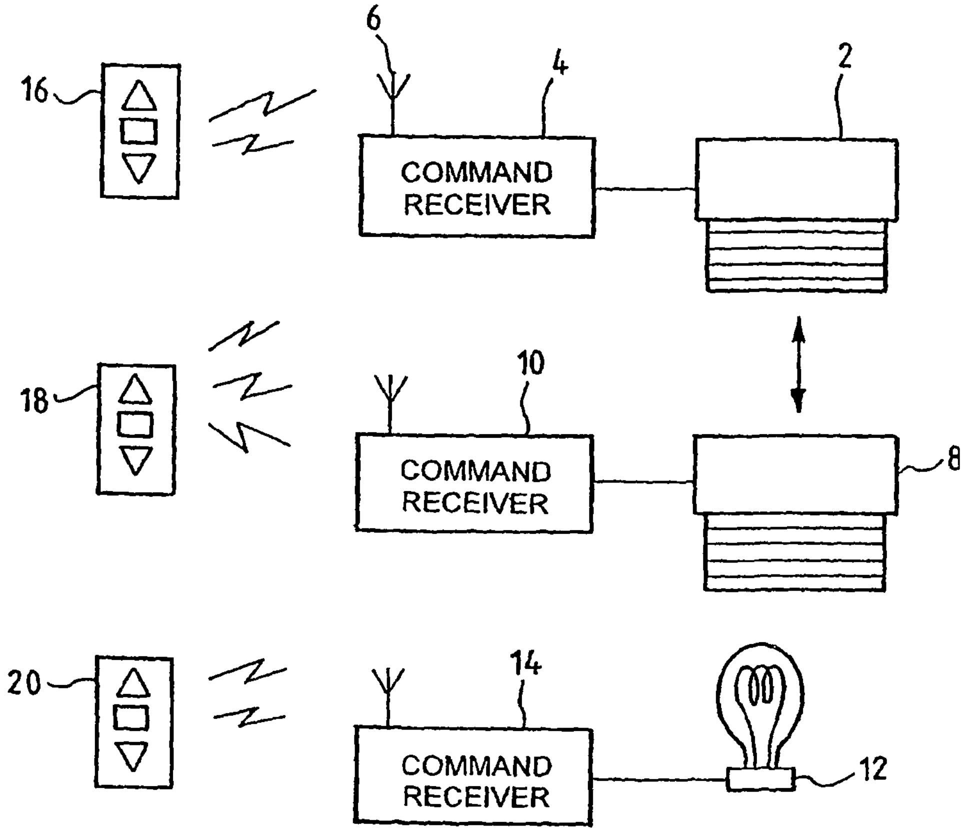
FIG. 1, a schematic view of a specific embodiment of an installation allowing the implementation of the invention.

FIG. 1 shows a schematic view of an installation in which the method can be implemented. The installation comprises an operating unit 2. This operating unit can, for example, roll blinds up or down, open or close rolling shutters or a garage door, switch a light on or off, open a door, trigger or clear an alarm, etc. The operating unit is connected to a receiver. The command receiver has an antenna 6 which allows it to receive commands transmitted via a radio link from a command transmitter; the command receiver 4 can also transmit signals, for example via radio link, using the same antenna 6. The radio transmission of commands from a transmitter to a receiver or vice versa is known per se and is not described here in more detail.

FIG. 1 also shows a plurality of operating units 8, 12, each with their command receivers 10, 14. It also shows command transmitters 16, 18 and 20; these are suited to transmitting by radio link one or more commands addressed to the receivers 4, 10, 14 and have an antenna for this purpose (not shown). Typically, a command transmitter, in the case of controlling a rolling shutter, can transmit commands to raise or lower the shutter, or to stop the shutter; other commands can also be given, such as placing the shutter in pre-programmed positions, commands for programming the shutter, etc. The command transmitter thus has one or more devices allowing the user to enter a command, in the simplest case one or more control buttons. A command transmitter is also capable of receiving signals from the command receiver(s); as with the command receiver, the same antenna is used.

A number of transmit or receive transmission channels can be provided for the command transmitter and the command receiver; in a simple configuration, radio is used, and thus the transmitter as a sender is a "transceiver", i.e. a transceiver.

Some of the bidirectional objects—transmitters and command receivers—are paired. The pairing, described in the documents from the state of the art mentioned above, consists in making each object of a pair "learn" the identifier of the other object of the pair; after pairing, one object of a pair executes the commands which are transmitted to it by the other object of the pair. These commands can be of very different nature depending on the installation; in a rolling shutters installation the commands are typically commands to raise or lower the shutters; commands for programming for the creation of other pairings can also be foreseen. In an alarm installation, the command can be to set off or to stop the alarm or a programming of functions. Thus, "command" can thus generally describe an instruction transmitted by one object to another object.

In an installation there can be as many pairings as pairs of objects and the reprogramming method described here applies independently of the way in which the pairing is realized.

In the following we consider, by way of example, the case where the following pairs are defined: (4,16), (10, 16), (10, 18), (4, 20), (10, 20) and (14, 20); the transmitter 16 controls the receivers 4 and 10, the transmitter 18 controls the receiver 10 and the transmitter 20 controls all of the receivers.

Figure 2:
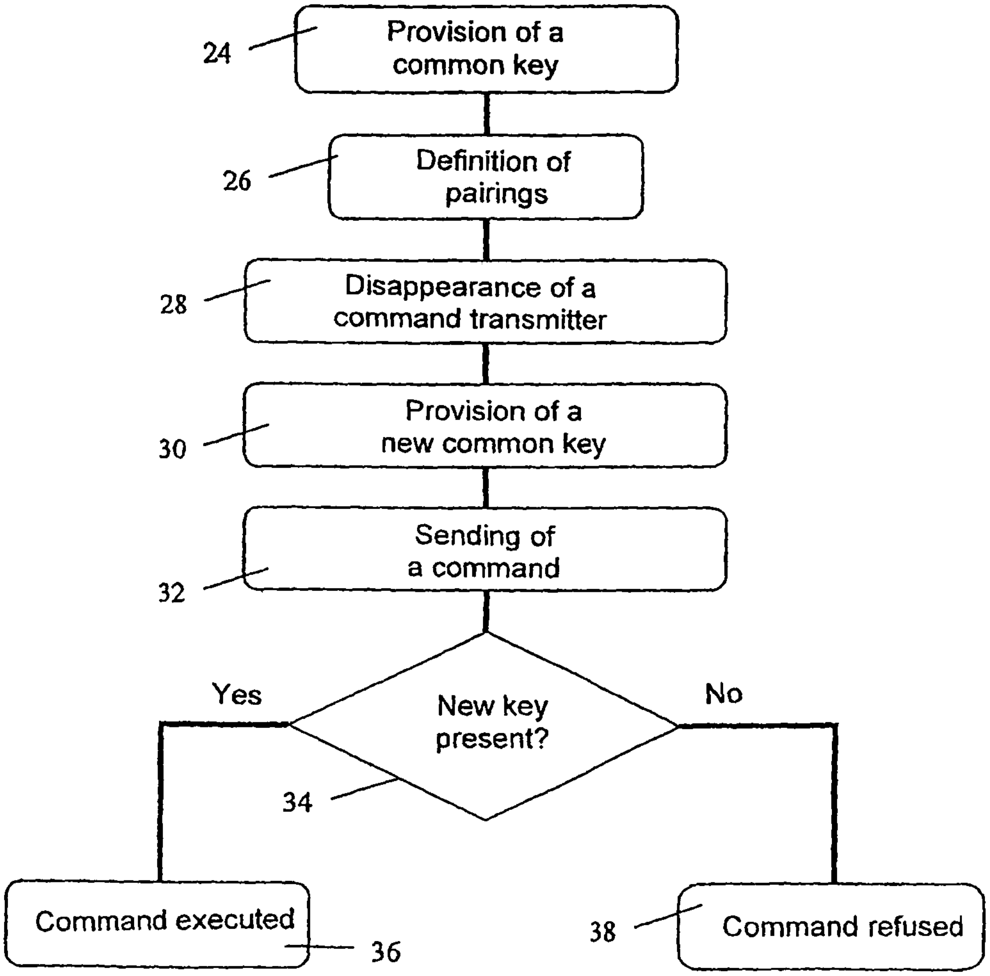
FIG. 2, a flowchart of a method according to the invention.

The physical and logical structure of a bidirectional object which can be used in such an installation is known to a person skilled in the art; in particular, reference can be made to the description given with reference to FIG. 2 of the French patent application 02 01631 of Feb. 11, 2002. In summary, a bidirectional object comprises a reception stage suited to receiving signals from the other objects or from some of them, a transmission stage suited to transmitting signals to the other objects or to some of them and a logical unit controlling the reception stage and the transmission stage. The object also has a memory, containing the programs used in the logical unit and in particular the operating programs of the object. As explained below, the memory of the object can also contain at least one common key; the object can also contain pairing information, for example identifiers of other objects stored in the memory. According to their use as command transmitter or as command sender, the objects can have different inputs (buttons, microswitches, switches) or outputs (to an operating unit); the operating program can also differ according to the functions for which an object is designed.

The problem resolved by the invention is that of reprogramming bidirectional objects, which arises when seeking to exclude an object from a group of paired objects. This problem arises in particular in the case of loss or stealing of an object. This problem also arises when seeking to replace one object with another, for example when replacing an old transmitter with a new transmitter. In the example proposed, in the case where the object 16 disappears it would be useful to be able to replace this object with a new command transmitter, without however having to reprogram the four other pairings.

FIG. 2 shows a flowchart of the steps of the method of the invention. Steps 24 and 26 are steps of providing the objects with a common key and of pairing amongst the objects; these steps are not strictly speaking a part of the method and can be carried out according to any method desired. Their order can be reversed, the step of pairings preceding that of providing of a common key. At the end of these steps a common key is provided to all of the objects which are to subsequently participate in the reprogramming. In the most simple case these are all of the objects of the installation; it can be imagined that the pairings are defined within two distinct sub-groups and that a common key is assigned to each of the sub-groups. For the provision of this common key the method described in the patent application EP 1 085 481 or in the French patent application 02 01631 of Feb. 11, 2002 can be used in particular. Whichever method is used, at the end of the provision step, the bidirectional objects which can subsequently participate in the reprogramming each have a common key. This common key is, for example, a sequence of numbers stored in a memory associated with each of the objects.

Step 28 corresponds to the disappearance of a command transmitter—which is only one example of a situation in which it can be sought to reprogram the objects. A disappearance of the command transmitter 16 is considered.

At step 30 a new common key is provided for the objects of the installation—but not for the object to be excluded. Various solutions for providing this new common key are detailed below. At the end of this step, the objects to be reprogrammed—with the exception of the object to be excluded—are provided with the new common key. As explained below, according to the nature of the authentification procedure, the new common key can be provided to the different objects in different forms.

At step 32, an object attempts to establish a communication with another object with which it is paired in order to transmit a command to it. In the example, a command transmitter is used to transmit a command to a command receiver.

At step 34, for the pair of objects assigned by the attempt to transmit a command, there is verification of whether the two objects are provided with the new common key. If this is the case, step 36 is initiated or otherwise step 38. The verification can be carried out according to any authentification procedure allowing each object to verify that the other is provided with the new key. In particular the authentification algorithms of the type described in U.S. Pat. No. 5,841,866 can be used. Knowledge of the new common key can also be demanded only from some of the objects: thus, in an installation, it can be assumed that fixed command receivers—such as motors of rolling shutters—do not run the risk of being lost or stolen. For this reason it may be sufficient, when attempting to send a command from a command transmitter to a command receiver, to verify that the command transmitter is provided with the new common key. In practice the verification requires provision of the new common key, in one form or another, to the command receiver.

At step 36, the two objects are seen as being provided with the new common key—in other words they are not excluded. The command is thus accepted, i.e. executed by its target. This is the case, in the example, if the command transmitters 18 or 20 are used. The user can thus continue to use command transmitters, as before. He does not need to reprogram all the pairings.

At step 38 the objects are shown as not both being provided with the new common key. The command is refused—the target of the command thus does not execute it. In the example, the command transmitter 16, which has not received the new common key, cannot control one of the two command receivers 4 or 10 with which it was paired.

This ensures that the excluded object can no longer be used in the installation, without all the pairings needing to be reprogrammed.

Steps 34, 36 and 38 are used for the different pairings considered; they can be used successively, whenever an object is used. They can also be used almost simultaneously: this could be the case if an object attempts to send a command simultaneously to a plurality of other objects. In the example proposed above, when the object 20 is used for the first time after the provision of a new common key, it transmits a command to objects 4, 10 and 14; thus the verification of step 34 is carried out three times, on each pair of objects. It could thus be imagined that the object 20 sends a common validation frame, by which the object 20 signals its knowledge of the common key.

Figure 3:
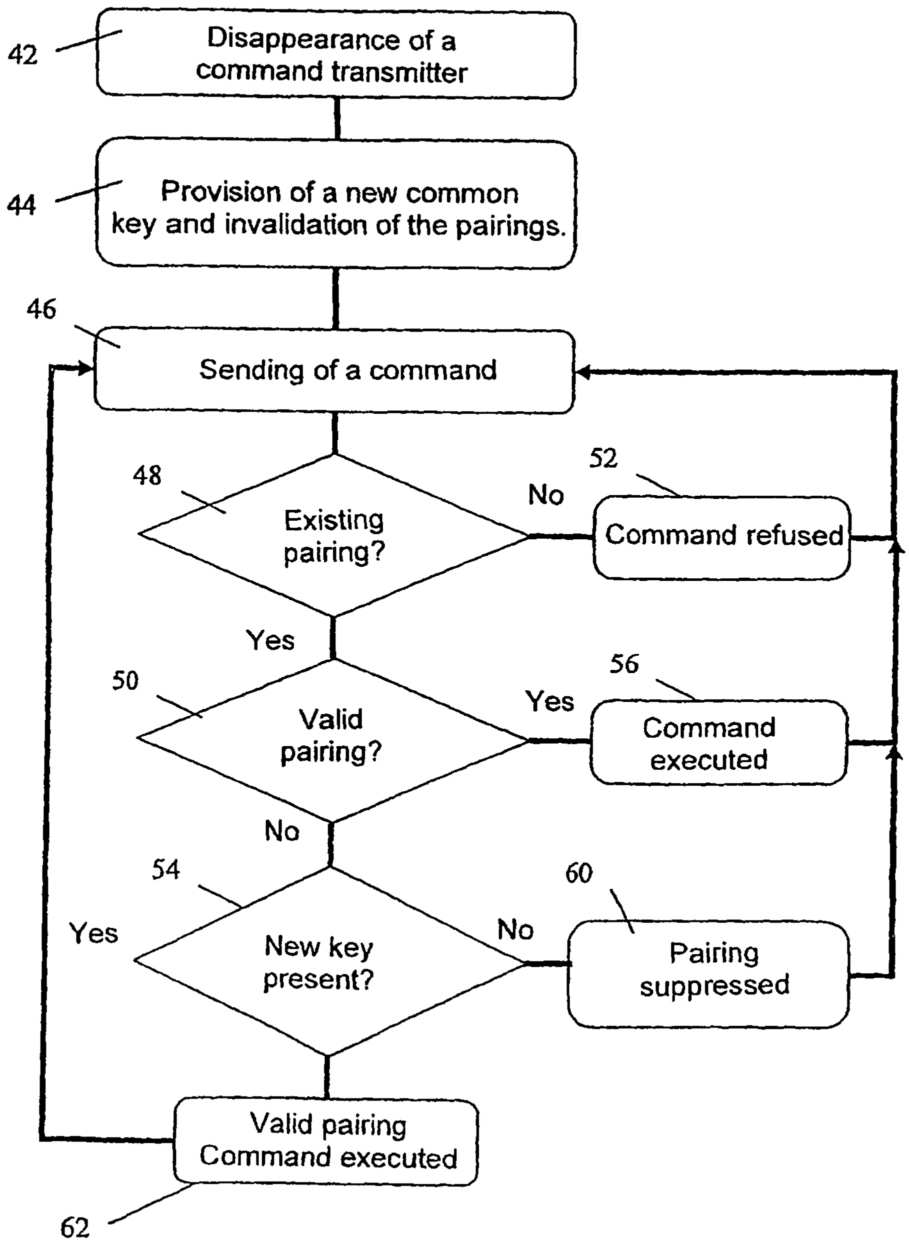
FIG. 3, a flowchart of another embodiment of a method according to the invention.

FIG. 3 shows a flowchart of a more developed embodiment of the invention. In the example of FIG. 3, the verification foreseen in FIG. 2 at step 34 of FIG. 2 for a given pair of objects is implemented only in the first attempt at sending a command from one object to the other.

In the example of FIG. 3, the pairings are realized by storage in an object of identifiers of all of the objects with which it is paired. Thus, in the example, the command transmitter 16 stores identifiers of the command receivers 4 and 10, while the command receiver 10 stores the identifiers of the command transmitters 16, 18, and 20. Moreover, a marker is provided for each identifier stored; the marker is binary and its function appears in the description which follows. In "normal" functioning of the installation, the marker has a first value—the value zero for example.

As in FIG. 2, objects provided with a common key and amongst which pairings are defined are assumed. At step 42 a command transmitter disappears. A new common key is provided in step 44. In each object which has received the new common key, the marker associated with each identifier changes value; it changes to the value 1. This value denotes that the pairing in question is, temporarily, invalid.

At step 46 an object sends a command to another object.

At step 48, in the object targeted by the command, there is verification of the existence of a pairing. If the pairing exists, step 50 is implemented, otherwise step 52 is implemented.

At step 52, in the object targeted, the command is refused if the pairing does not exist. This is a normal application of the functioning rules of the objects.

At step 50, in the object which has received the pairing a test of whether the corresponding marker is valid is carried out—at state "0" in the example. If this is the case, step 56 is implemented, otherwise step 54 is implemented.

At step 56 the command is executed.

At step 54, in the transmitter object and in the object targeted by the command a test of whether the new key is present is carried out. If this is the case, step 62 is implemented, otherwise step 60 is implemented.

At step 60, the pairing is suppressed in the two objects. The pairing is thus invalid permanently; in the simplest embodiment, the memories of each of the objects of the pair storing the identifier of the other object of the pair are erased. This ensures that the excluded object can no longer be used in the installation. More complex solutions can be foreseen, for example notifying the user with a particular signal or causing complete deactivation of the objects. The pairing can also not be suppressed until after a second attempt, which gives the user the possibility to transmit the new common key to the object not provided with it.

At step 62, the command is executed and the marker of the identifier of the other object changes to the value "0" in the two objects. The pairing is again "valid" or "restored".

After steps 52, 56, 60 and 62 step there is a return to step 46.

The flowchart of FIG. 3 is followed through as explained below. The example considered above is considered. After the provision of the new common key, the objects 4, 10, 14, 18 and 20 have received the new common key and have changed the markers of all their paired objects to "0", thus invalidating all the pairings.

It is assumed that the object 18 sends a command to the object 10. The flowchart is followed through according to steps 48, 50, 54. At step 54, the two objects are provided with the common key and step 62 is implemented: the markers of the identifier of object 10 in object 18 and of the identifier of object 18 in object 10 change to "0". If object 18 sends a new command to object 10, the flowchart is followed through according to steps 48, 50, 56. The presence of the marker makes it possible to test for the presence of the new common key only once, which simplifies the exchanges.

It is assumed that object 16 is used to transmit a command to objects 4 and 10. For each pairing the flow chart is followed through according to steps 48, 50, 54. At step 54, object 16 does not have the new common key. For this reason, at step 60, the pairing is suppressed. Thus, the identifiers of objects 4 and 10 are suppressed in object 16 and the identifier of object 16 is suppressed in objects 4 and 10. This prevents a subsequent attempt to use object 16 from being totally—it would lead to the flowchart being followed through according to steps 48 and 52. This also allows a memory location to be cleared in the objects to allow other pairings.

The solution of FIG. 3 makes it possible, when there is a second command, to not verify again the presence of the common key; a subsequent command can thus be executed without verification of the existence of a common key. It also makes it possible to determine, for a given object, at what point the group of the objects to which this given object is connected has been scanned: in fact, when all of the markers have changed back to "0", all of the pairings have been "restored".

In another embodiment, it can be provided that the verification is carried out only over a predetermined period of time following the provision of a new common key; this embodiment ensures greater security by eliminating objects which are not used or rarely used. In this case, at the end of the predetermined time period, the identifiers of the objects whose marker is still at "1" are eliminated.

Steps 48 to 62 are implemented for the different pairings considered; they can be implemented successively, whenever each object is used. They can also be implemented almost simultaneously: this could be the case if an object sends a command simultaneously to a plurality of other objects. In the example proposed above, when object 20 is used for the first time after the provision of a new common key, it transmits a command to objects 4, 8 and 12; thus steps 48, 50, 54 and 62 are carried out three times, on each pair of objects. Thus it could be imagined that the object 20 sends a common validation frame, by which object 20 signals its knowledge of the common key.

Finally it must be noted that in the examples cited, each pairing is realized by the storing in an object of identifiers of all of the objects with which it is paired. As is described in the state of the art, the pairing can be more simply realized by a partial storing: for example that of the identifier of a command transmitter in a command receiver, without the identifier of the command receiver being stored in the command transmitter, or by storing one of the identifiers or addresses of the command receiver in a command transmitter, without said command receiver containing the identifier of the command transmitter. In each case the command receiver still has the possibility of making the pairing invalid, or of suppressing it, as explained above.

Various solutions allow provision of a common key to a group of objects as described below. In a first variant, the provision of a new common key is carried out using only one of the roving or fixed remote control points. A specific keyboard command or combination of keys, allows this remote control to be entered into a mode where it generates a new key NK, for example using a semi-random algorithm, or by any other means, this has no effect on the contents of the invention. It is noted that the old common key OK can be kept in the memory by the remote control, for the reasons explained below. This variant has the advantage of simplicity and facility of implementation.

In a second preferred variant, at least two control points are required to allow changing of the common key of one of them. Thus, if seeking to change the common key using the remote control T1, the keyboard procedure of the first variant is used, but this causes transmission by T1 of a request for particular authentification. In the transmission frame, T1 sends sign proving that it contains the old common key—this can be the value of this common key in clear, or any other encrypted value derived from this common key.

On reception of such a request for authentification ET in response to at least one keyboard command by the user, another remote control T2 will send an acquisition signal to T1 as long as T2 has verified that the old common key transmitted by T1 was in fact the one known to T2. Only upon reception of such an acquisition signal is the remote control T1 able to modify its own common key by creating NK while keeping the old key OK in memory. In order to increase the security related to this method, it can be required that the acquisition signal be transmitted in a short time span following the transmission of the particular authentification request signal.

In a second variant, at least two control points are required to generate a new common key, which reduces the possibility of fraudulent usage. Thus it is not possible to change the common key using simply a stray actuator.

After this first step, one of the objects—a remote control in the example—is provided with the new key. It is then necessary to transmit the new key NK to the other control points.

According to a first variant, this transmission takes place in a more or less collective fashion, i.e. point-to-multipoints; according to a second variant, this transmission takes place by a succession of point-to-point transmissions. In the first variant, the object which contains the new key addresses, in response to a specific keyboard command from the user, or directly after the generation of the new key, a message to the group of objects requesting changing of the key; the message contains both the old key OK and the new key NK. Any object receiving this message, optionally repeated within a time span of a few minutes, changes its own current common key to the new key NK, after having verified the identity of its current key with the old key OK. The verification of the old key prevents an object from a neighbouring installation changing its key by receiving the message with the new key. This first variant exploits the capabilities of the objects to be transmitted and received; it has the advantage of simplicity—because the user needs only to be provided with one object to cause the new key to be provided to all the objects of the installation.

Another form of this first variant which is called collective consists in the object which is provided with the new key simply sending a command to change the key accompanied by the new key NK. Each object receiving the general command requesting changing of the key then engages a dialogue of authentification with the object provided with the new key, and only accepts the new key NK if this dialogue proves that the object provided with the new key contains the old common key OK. As in the preceding form, this prevents an object from an installation from reacting to a command to change the key issued by an object from another installation.

In the second variant, the new key is transmitted from object to object, with at least one user operation in each transmission. The transmission of the new common key is accompanied by the transmission of the old common key, or leads to a dialogue which proves to the object receiving the new key that the object transmitting the new common key also had the old one. Allowing for a user operation in each transmission makes the provision of the new key safe. Thus, even if the object to be expelled is still within radio range—for example because it is simply lost in the house—it is not provided with the new key. This improves the security because the presence of an object to be excluded within radio range of the other objects nonetheless allows it to be excluded. This prevents an object from being picked up by a passer-by who would use it fraudulently. Moreover, this variant accepts a mode of low consumption of the control points, which only gives these a reception functioning in a manual activation. In this second variant it is also possible to require the use of two objects to generate the new key.

These two variants can be implemented for the group of objects; however it is advantageous however to use them only to transmit the new key to the bidirectional objects used as control points. The control points are easily accessible to the user, which makes the second variant easy to implement. By contrast it may be difficult for the user to access each operating unit or receiver for a manual command. These variants could also only be implemented for roving remote controls, i.e. for the control points which are not fixed: we may start from the principle that the fixed control points cannot normally disappear.

If one or the other of these variants is implemented for the control points only—or for a sub-group among them—the new key can then be transmitted to the other objects as explained below. The transmission of the new key to the actuators can initially be realized according to the modalities given in the patent application 02 01631 of Feb. 11, 2002. In this application, it is proposed to apply an initiator event to several objects in a synchronous fashion, such as a double cutting of the power supply. Then there is sending—for example by one of the objects which has been subjected to the initiator event—of a message containing a group identifier. An object which has been subjected to the initiator event and which receives this message stores the group identifier, and then considers that it is part of the group defined by this identifier. The moment of application of the initiator event can serve as a time reference in each object to secure the definition of the group.

To transmit the new key, the initiator event can be constituted by a collective command specific to the remote control which is already provided with the new key; the initiator event can also be constituted by a specific action on a power supply line common to the actuators, if necessary followed by the reception of a new key. As long as the actuators or the fixed control points are identified as such—for example upon installation or in the factory—it is sure to send the new key, if appropriate accompanied by the old key, to the actuators and/or the control points: in fact, such a command can be accepted only by objects identified as fixed and would not be accepted by a mobile control point which is lost. This solution also applies to the replacement of a fixed object: it would be sufficient for the fixed object to be replaced not to be subjected to the initiator event. In the case of a fixed control point the battery power supply can simply be removed; for an actuator or a control point connected to the mains, the control point can be disconnected.

From the point of view of an object, the method described above simply involves receiving a new key, verifying when the command is subsequently sent—being transmitted or received—that the targeted object or sender is provided with the same new key and invalidating the pairing if the pairing existed previously and if the verification is negative. An operating program of an object thus comprises routines adapted to the implementation of each step of the method.

The implementation by programming of the different steps proposed is not detailed: a person skilled in the art is capable of this using programming techniques known per se, using the information provided in the above description.

The method described above has the following advantages: in the case of loss or stealing of an object—a remote control for example—there is no need to implement a full re-pairing procedure to reestablish all the pairings between valid remote controls and actuators: these individual pairings are simply suspended by the method of changing the common key and become valid again by a simple confirmation of a match with the new common key; for the user, it is only necessary to launch the provision of a new key, the other steps cannot be detected and do not require the intervention of the user.

Even in the case where the user is required to validate the transmission of the new key on each control point, the method keeps the pairings. The number of actions is thus only a function of the number of control points and not on the number of pairings. In the example proposed above, if the remote control 16 disappears, the transmission of the new key can be validated on the remote controls 18 and 20, without having to reestablish the pairings (12, 18), (4, 20), (8, 20) and (12, 20).

From the point of view of security, the example of FIG. 3 allows provision of the common key with much lower security constraints than for the pairing. In fact it is not a problem if the new common key is also accidentally provided to non-paired command transmitters: these command transmitters are not paired and thus cannot use this common key. This is clearly seen in the flowchart of FIG. 3, because a command transmitted by a non-paired transmitter is refused (step 48, 52).

Another advantage is that the common key can be globally provided to all the transmitters of an installation, without consideration of the pairings.

The invention is not of course limited to the embodiments given above. The radio transmission used between a transmitter and a receiver is given as an example only and can be modified. The invention applies in particular when the transmitters and receivers use a single frequency or each transmit on a separate frequency, or by frequency hopping, or with different modulations. Separate transmission mediums could also be used in the transmitter to receiver direction or in the receiver to transmitter direction, or separate transmission mediums for separate groups of transmitters or senders. In fact the method applies whenever the command transmitters or receivers are "bidirectional objects" capable of transmitting and receiving.

The terms "command receivers" and "operating units" have been used, which apply in particular to the example of operating units of rolling shutters. The receiver and the operating unit can be separate elements, as in the examples, or else they can form a single assembly—for example by integration of the command receiver into the operating unit.

Obviously the messages or the identifiers can be coded or encrypted using the techniques known from the state of the art.

Specific embodiments of a method for reprogramming bidirectional objects according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

The invention claimed is:

1. A method for reprogramming a plurality of bidirectional objects belonging to a home automation installation, each object of the home automation installation having a univalent identifier stored in a memory, wherein the method comprises:

i. providing an initial common key;

ii. storing the initial common key in the memory of at least a first object, a second object, and a third object of a group of objects in the home automation installation;

iii. pairing the first object to the second object and to the third object, wherein the pairing of two objects includes storing in the memory of the objects to be paired information on the identifier of the other object;

iv. providing a new common key, the provision of the new common key being launched by a user, and storing the new common key in the memory of the first object and in the memory of the second object, excluding the third object from being provided with the new common key; then v. invalidating the pairing between the first object and the second object and between the first object and the third object, but keeping in the memory of the second and the third object the information on the identifier of the first object and/or keeping in the memory of the first object the information on the identifier of the second object and the identifier of the third object;

vi. sending a command from the third object to the first object;

vii. receiving a command from the third object at the first object;

viii. verifying, in the first object, if the new common key is stored in the memory of the third object; and ix. refusing by the first object the execution of the command sent by the third object, although the first object and the third object are still paired and although the information on the identifier of the third object is stored in the memory of the first object;

x. sending a command from the second object to the first object;

xii. receiving a command from the second object to the first object;

xiii. verifying, in the first object, if the new common key is stored in the memory of the second object; and xiv. when the verification is positive, validating the pairing between the first object and the second object and executing by the first object the command send by the second object, thereby providing for the third object to be excluded from the group without reprogramming the pairings existing between the objects of the home automation installation.

2. The method of claim 1, wherein the step of verifying for two given objects is carried out only when a command is sent after the new common key was provided.

3. The method of claim 1, wherein the step of providing of the new common key comprises:

generating a new common key; and transmitting the generated new common key.

4. The method of claim 1, wherein the new common key is provided globally to all the objects of the installation, without consideration of the pairings.

5. The method of claim 1, wherein pairings of paired objects are suspended during the step of providing the new common key and become valid again upon confirmation that the paired objects contain the new common key.

6. The method of claim 3, wherein the step of generation is carried out using a single object.

7. The method of claim 3, wherein the step of generation is carried out using two objects.

8. The method of claim 3, wherein the step of transmission comprises a point-to-multipoint transmission.

9. The method of claim 3, wherein the step of transmission comprises point-to-point transmission.

10. The method of claim 3, wherein the step of transmission comprises:

a point-to-point transmission in a sub-group of the objects; and a point-to-multipoint transmission to another sub-group of the objects.

11. The method of claim 3, wherein the transmission step comprises, when the new common key of an object is transmitted to another object, verification that the two objects contain the old common key.

12. The method of claim 9, wherein the point-to-point transmission comprises an action by the user on each point.

13. An operating program for a bidirectional object, contained in a memory, and adapted to store at least one common key and at least one piece of information on pairing, comprising:

(a) a routine of receiving a common key that can be shared with at least two other objects;

(b) a routine of learning and keeping in the memory the pairing information of identifiers of other objects to which the bidirectional object is paired;

(c) a routine of receiving and storing a new common key without erasing the pairing information, the routine of receiving and storing the new common key being launched by a user;

(d) a routine of invalidating the pairing information of the identifiers of the other objects to which the bidirectional object is paired, but keeping in the memory the pairing information of the identifiers of the other objects to which the bidirectional object is paired;

(e) a routine of receiving a command from a paired transmitter object;

(f) a routine of verifying the presence of the new common key in the paired transmitter object upon receipt of the command from the paired transmitter object;

(g) a routine of refusing to execute the command when the verification is negative, although the command is received from a paired object; and (h) when the verification is positive, a routine of validating the pairing information of the identifiers of the other objects to which the bidirectional object is paired and a routine of executing the command.

14. The program of claim 13, wherein the routine of verifying for a given pairing is implemented only when a command is received.

15. The program of claim 13, further comprising a routine of generating a new common key.

16. The program of claim 13, further comprising a routine of transmitting a new common key to another object.

17. The program of claim 13, further comprising a routine of transmitting a new common key to more than one object.

18. The program of claim 15, wherein the routine of generating comprises a sub-routine of transmitting a command to generate the common key to another object.

19. An operating program for a bidirectional object, contained in a memory, and adapted to store at least one common key and at least one piece of information on pairing, comprising:

(a) a routine of receiving of a common key that can be shared with at least two other objects;

(b) a routine for learning and keeping in the memory the pairing information of identifiers of other objects to which the bidirectional object is paired;

(c) a routine of receiving and storing a new common key without erasing pairing information, the routine of receiving and storing the new common key being launched by a user;

(d) a routine of invalidating the pairing information of the identifiers of the other objects to which the bidirectional object is paired, but keeping in the memory the pairing information of the identifiers of the other objects to which the bidirectional object is paired;

(e) a routine of transmitting a command to a targeted paired object; and (f) a routine of verifying the presence of the new common key in the targeted object; and (g) when the verification is positive, a routine of validating the pairing information of the identifiers of the other objects to which the bidirectional object is paired.

20. The program of claim 19, wherein the routine of verifying for a given pairing is implemented only when a command is transmitted.

21. The program of claim 19, further comprising a routine of generating a new common key.

22. The program of claim 19, further comprising a routine of transmitting of a new common key to several other objects.

23. The program of claim 19, further comprising a routine of transmitting of a new common key to another object.

24. The program of claim 21, wherein the routine of generating comprises a sub-routine of transmitting of a command to generate the common key to another object.

25. A bidirectional object, having:

a receiving stage;

a transmitting stage;

a memory, containing an operating program for a bidirectional object adapted to store at least one common key and at least one piece of information on pairing, and a control unit executing said program; said program comprising:

a routine adapted to receive a common key that can be shared with at least two other objects;

a routine adapted to learn and keep in the memory the pairing information of identifiers of other objects to which the bidirectional object is paired;

a routine adapted to receive and store a new common key without erasing pairing information, the routine adapted to receive and store the new common key being launched by a user;

a routine adapted to invalidate the pairing information of the identifiers of the other objects to which the bidirectional object is paired, but to keep in the memory the pairing information of the identifiers of the other objects to which the bidirectional object is paired;

a routine adapted to receive a command from a paired transmitter object;

a routine adapted to verify the presence of the new common key in the transmitter object upon receipt of the command from the paired transmitter object;

when the verification is negative, a routine adapted to suppress the pairing information of the identifiers of the other objects to which the bidirectional object is paired and a routine adapted to refuse execution of the command, although the command is received from a paired object; and when the verification is positive, a routine adapted to validate the pairing information of the identifiers of the other objects to which the bidirectional object is paired and a routine adapted to execute the command.

* * * * *